United States Patent Office 2,813,794
Patented Nov. 19, 1957

2,813,794
PROCESS FOR PREPARING A CASEIN GEL

Mortimer Louis Anson, Cambridge, Mass., and Morton Pader, West Englewood, N. J., assignors to Lever Brothers Company, New York, N. Y., a corporation of Maine No Drawing. Application November 16, 1955, Serial No. 547,339

5 Claims. (Cl. 99—20)

This application is a continuation-in-part of applicants' copending application Serial No. 304,844, filed August 16, 1952.

The present invention relates to a process for preparing a protein gel, and more particularly to a process for preparing a casein gel.

Applicants' above-identified copending application pertains to a protein food product and methods of making the same. The protein food product described therein has the texture of meat and meat products and comprises a heterogeneous, cohesive mass of discrete particles of chewy protein gel and an outer additive. The process for forming such a protein food product comprises adjusting the composition of a protein-water system to a composition conducive to gel formation (gel precursor) by adjusting the pH thereof and adjusting the protein content, shaping the system, and applying to the system such heat as is necessary to produce a chewy gel. The shaping may take place before or after either of the other steps of the process. Means for shaping comprise extrusion, slicing, chopping, pressing, molding, and the like. Among the preferred proteins for use in such a process are oilseed proteins, such as those obtained from peanuts and soybeans, and fish proteins and casein.

Relatively concentrated aqueous dispersions of casein at a pH of about 6–7 form gels when they are heated. These gels, however, are not suitable for use in the above process because they soften or melt when warmed and do not have the chewing qualities characteristic of chewy gels made, for example, from oilseed protein.

Accordingly, it is the object of the present invention to provide a process for preparing a casein gel suitable for use in the above process and product, i. e., controlling the solubility of the casein by the adjustment of pH and the addition of a precipitating salt and heating.

The term "gel precursor," as used herein, refers to a system essentially of casein and water which is capable of forming a chewy gel on being heated. A "chewy protein gel" refers to a system essentially of protein (casein) in colloidal dimensions in water and which when pieces of substantial size are chewed in the mouth has the physical properties of resilience, elasticity and resistance to sheer.

The process of the invention comprises forming an aqueous solution of casein at a pH of about 6.8. The casein may be in the form of commercial casein or skim milk. The solution of casein is heated to above 70° C., and preferably in the range from about 85° C. to about 100° C. The preferred length of the time of heating is roughly inversely proportional to the temperature, i. e., longer at lower temperature and shorter at higher temperature. At a temperature of about 95° C., approximately 1 to 5 minutes are sufficient to give excellent results. A water-soluble calcium salt, such as calcium chloride, acetate, bromide, or nitrate, is then added to give a calcium ion concentration of about 0.1 N. If the pH is not lowered to about 6 by the addition of the calcium salt, then acid is added to lower the pH to this value, a pH value which is considerably above the isoelectric point of casein which is around pH 4.7. The casein is thereby precipitated in a form conducive to gel formation, i. e., as a gel precursor. The precipitated casein is then collected, e. g., by centrifugation.

The gel precursor as prepared by the process of this invention is heat processed, usually by autoclaving, with or without the adjustment of the concentrations of the protein and calcium salt and small further adjustment of the pH. The resulting heat-irreversible chewy gel formed thereby may be further processed in accordance with the process of applicants' copending application described above for use in the protein food product described therein.

The process of the invention will be further described in connection with the following example.

Example 1

50 grams of commercial casein were dispersed in 950 cc. of water. The casein was then brought into solution by the addition of 28 cc. of 1.1 normal sodium hydroxide; the pH of the resulting solution was 6.8. The solution was heated to 95° C. for 4 minutes and, while it was being mixed, 18.6 cc. of solution containing 0.295 gram of calcium chloride per cc. were added. A granular mass precipitated; the pH of the suspension was 6. The mass became somewhat stringy on cooling. It contained 36% solids when collected by centrifugation.

The resulting gel precursor was placed in a tray to a height of about ¼ inch and placed in an autoclave in which it was subjected to saturated steam at 15 p. s. i. g. for 15 minutes. The product was then removed from the autoclave and allowed to cool.

The heat-irreversible gel which was thus prepared possessed good structure and marked chewiness and could be shaped into discrete particles of chewy protein gel.

It is evident that numerous modifications will appear to those skilled in the art upon reading the foregoing description. All such modifications are intended to be included in the scope of the invention as defined by the following claims.

We claim:

1. The process of preparing a chewy casein gel suitable for use in protein food products simulating meat comprising forming an aqueous solution of casein at a pH of about 6.8, heating the casein solution to a temperature above 70° C., adding a water-soluble calcium salt thereto to give a calcium ion concentration of about 0.1 normal, lowering the pH to about 6, collecting the resultant gel precursor, and heating the gel precursor.

2. The process of preparing a chewy casein gel suitable for use in protein food products simulating meat comprising forming an aqueous solution of casein at a pH of about 6.8, heating the casein solution to a temperature in the range from about 85° C. to about 100° C., adding a water-soluble calcium salt thereto to give a calcium ion concentration of about 0.1 normal, lowering the pH to about 6, collecting the resultant gel precursor, and autoclaving the gel precursor.

3. The process as set forth in claim 2 wherein the calcium salt is calcium chloride.

4. The process as set forth in claim 2 wherein the casein is in the form of commercial casein.

5. The process as set forth in claim 2 wherein the casein is in the form of skim milk.

References Cited in the file of this patent

UNITED STATES PATENTS

| 869,371 | Kellogg | Oct. 29, 1907 |
| 2,560,621 | Wrenshall | July 17, 1951 |

FOREIGN PATENTS

| 637,425 | Great Britain | May 17, 1950 |
| 699,692 | Great Britain | Nov. 11, 1953 |